Patented Jan. 13, 1953

2,625,482

UNITED STATES PATENT OFFICE 2,625,482

PROCESS OF PRODUCING MODIFIED LARD

Karl F. Mattil and Frank A. Norris, Chicago, Ill., assignors to Swift & Company, Chicago, Ill., a corporation of Illinois No Drawing. Application March 5, 1951, Serial No. 214,024

8 Claims. (Cl. 99—118)

The present invention relates to the treatment of lard, and more particularly to the production of lard and lard-containing products having improved properties.

Lard, commercially the most important triglyceride material from an animal source, is fat obtained from the fatty tissue of hogs by a heat, solvent or enzyme treatment of the fatty tissue. The most common method of obtaining lard from the fatty tissue of hogs is the so-called wet or steam rendering treatment in which the fat is separated from the tissue by means of pressure with hot water or steam to give what is known as prime steam lard. Another common method of obtaining lard is by the dry rendering process in which fat is removed from the fatty tissue by means of heat alone. The latter method of obtaining lard includes the kettle rendering process in which the fat is melted in a hot water or a steam jacketed kettle. Other methods of obtaining lard, such as solvent and enzymatic treatment of fatty animal tissue, while not widely used on a commercial scale, are potentially important sources of lard.

After recovering the lard from the fatty tissue, the lard is generally treated to impart certain desired characteristics thereto. Thus, the lard may be settled, bleached, refined, washed, filtered, and deodorized to yield a substantially odorless and tasteless product.

Lard is often further treated to impart thereto the desired degree of plasticity, as when the lard is to be used in baked products. This desired plasticity may be obtained by a process which includes compounding therewith hardened lard or an hydrogenated vegetable fat, incorporating air therein and chilling. Of particular importance in the texturizing process is the chilling step. This chilling of the lard may be accomplished by means of chill rolls or an internal chilling machine. In the former method molten fat is picked up on the surface of the internally chilled rotating rolls and then subsequently scraped therefrom and further worked to give the lard a uniform plastic consistency. Chilling by means of an internal chilling machine is accomplished by passing molten fat through a series of vertical or horizontal units where the fat is supercooled and allowed to solidify while being rapidly worked. The lard product treated in the foregoing manner is generally employed as a shortening. Heretofore the plasticity of the final product has depended to a great extent on the nature of the foregoing chilling operation, and the final plasticity has been highly sensitive to the conditions of the chilling step. For this reason the operating conditions in the chilling step have necessarily been very critical and required very careful control.

Another important characteristic of a shortening is its creaming ability. This creaming ability is a measure of the amount of air that can be incorporated into a batter during the mixing operation. The greater the amount of air absorbed and retained by the fat, the greater the leavening effect of the shortening. Thus, for example, the volume of a cake may be increased by the use of shortening possessing superior creaming properties. The creaming ability of a shortening may be determined by measuring the density of the batter or dough, or by measuring the volume of a cake in which the shortening has been incorporated. A high specific gravity indicates a relatively dense mass with only a small amount of incorporated air, while a low specific gravity indicates a light, fluffy mass having a large amount of air incorporated therein. In general, the value of a shortening increases with its ability to absorb air.

Still another very important characteristic of a shortening is its appearance, particularly after being held at the elevated temperatures frequently encountered during distribution and sale of the product. Solidified animal triglyceride material such as lard and lard-containing products frequently have a dull, waxy, and Vaseline-like appearance which becomes progressively more pronounced the longer the product is held. The appearance of lard and lard-containing products is generally considered much inferior to the appearance of vegetable shortenings which have been held under comparable storage conditions, since vegetable shortenings possess a smooth, satiny luster which is retained even after prolonged storage.

While lard has unsurpassed shortening properties, the vegetable shortenings are generally considered to have superior creaming and emulsifying properties as well as improved appearance and storing properties. One of the principal causes for the inferiority of the appearance, storing properties, creaming ability, and emulsifying properties of the lard is the needle-like, crystal formation which the lard glyceride molecules assume upon solidifying and which continue to grow during storage. The long, needle-like crystals impart to lard and lard-containing products the waxy, rubber-like texture or graininess which becomes much more pronounced and highly objectionable on standing at the relatively high temperatures generally encountered when distributing through normal commercial channels. Although it has been found possible to temporarily alter the crystallization pattern of lard by packaging while holding the lard at a carefully controlled, relatively low temperature, the lard crystals soon revert to their natural long, needle-like form when the lard is allowed to stand at room temperature. For this reason the foregoing temperature treatment during the packaging of lard is of no practical value when applied to lard which is to be distributed through normal commercial channels.

In order to overcome the foregoing objectionable properties of lard and lard-containing products which have been found to be attributable to the normal crystallization habit of lard, it is an essential object of the present invention to permanently alter the normal crystallization habit of lard so as to prevent the formation of large, needle-like crystals during crystallization and subsequent storage.

An additional object within the broad scope of the invention is to provide lard in which the heat of crystallization normally associated with the said lard is substantially altered.

Another object of the invention is to provide a product containing lard having improved plastic properties, including improved pliability and workability.

An additional object of the invention is to provide a lard product having improved appearance characterized by a smooth velvety sheen.

A further object of the invention is to provide a lard product having properties which equal or excel those of vegetable shortening while maintaining the superior shortening characteristic of lard.

Still another object of the invention is to provide a lard product having improved baking qualities, including enhanced emulsifying and creaming properties.

A still further object of the invention is to provide a satisfactory lard product which may be texturized with a greater degree of flexibility in the operating conditions.

Still further objects of the invention will be apparent from the following description and claims.

In accordance with the present invention it is proposed to subject lard to a heat treatment in the presence of a substance capable of changing the crystallization properties thereof under conditions which do not cause an appreciable change in the melting point of the glyceride material or or a significant change in the distribution of the several types of triglyceride molecules in the fatty material being treated. The reaction which modifies the triglyceride molecules is highly complex and the mechanism is not completely understood. It has been observed, however, that the crystal habit and the heat of crystallization of the triglyceride molecules of lard are very significantly affected. And, since the substances capable of modifying the crystallization properties of triglyceride molecules do not become part of the crystal modified triglyceride molecules, the reaction appears to be catalytic. Therefore, the effective substances are herein referred to as crystal modifying catalysts.

Heretofore when a liquefied glyceride fatty material has been treated with certain catalytic agents, the conditions which have heretofore been employed cause a molecular redistribution of the fatty acid groups between the triglyceride molecules and result in a change in the composition of the glyceride molecules. This redistribution has been termed interesterification or transesterification. The final result of the interesterification is a random distribution of the fatty acid molecules among the glyceride molecules. The interesterification is evidenced by an appreciable change in the melting point of the treated product and in the quantity of the triglyceride material which crystallizes from a solvent for the glyceride product at a specific temperature. For example, when cottonseed oil is interesterified with any of the recognized interesterification catalysts and under conditions employed heretofore, the melting point and consistency of the glyceride material is significantly altered.

In marked contrast with the previous method of catalytically treating triglyceride material, the hereindisclosed crystal modifying treatment does not cause an appreciable change in the melting point of the material, a change in the chemical composition and structure of the fatty acid groups of the glyceride molecules, nor an appreciable change in the proportions of the several types of glyceride molecules in the material being treated. There appears to be no significant amount of interesterification of the glyceride molecules under the conditions employed in the present invention as measured by the increase of trisaturated glycerides, although a small degree of interesterification has been observed to occur during the crystal modification treatment and to continue after crystal modification has been completed.

More particularly the present invention contemplates heating lard at relatively moderate temperatures above the melting point of the highest melting point components of said glyceride material in the presence of a crystal modifying catalyst for a period sufficient to substantially alter the normal crystallization habits of the triglyceride molecules but without causing any significant amount of interesterification of triglyceride molecules.

It has been found that a number of catalysts are effective in accomplishing the purposes of the present invention. Many organic and inorganic salts have been found to be effective. Among the inorganic salts which have been successfully employed to crystal modify lard are the halides, hydroxides, and sulfates of tin; the halides, oxides, hydroxide, and acetate of zinc; the oxides, carbonate, acetate, and nitrate of lead; halides, hydroxides, acetate and nitrate of cobalt; the halides, hydroxides, carbonates and sulfates of iron; and inorganic salts of antimony, cadmium, nickel, mercury, bismuth, aluminum, magnesium, and titanium. Examples of inorganic salts which have been successfully employed to crystal modify lard are stannous chloride, stannous hydroxide, stannous sulfate, stannic sulfate, and stannic chloride, zinc acetate, zinc chloride, zinc hydroxide, zinc oxide, zinc peroxide, zinc iodide, lead dioxide, lead carbonate, lead acetate, lead nitrate, red lead oxide, cobaltous chloride, cobaltous nitrate, cobaltous hydroxide, cobaltous acetate, cobaltic acetate, cobaltic nitrate, ferrous carbonate, ferrous hydroxide, iron subsulfate, ferric chloride, antimony trichloride, cadmium oxide, nickel sulfate, mercuric bromide, aluminum chloride, aluminum stearate, bismuth nitrate, magnesium nitride, and titanium tetrachloride. Other inorganic salts within the classes illustrated and suggested by the foregoing compositions may likewise be employed as catalysts in the present invention.

The effective amount of the foregoing polyvalent metal salts may range from about 0.01 per cent to about 3.0 per cent and higher and preferably between about 0.1 per cent and 2.0 per cent, based on the weight of the fat which it is desired to modify. The catalyst may be added in dry form, in the form of solution, suspension, or by means of a solid carrier, such as kieselguhr. The catalyst may also be added in the form of a saturated solution or slurry, or as a dilute solution, the amount to be added being calculated on the dry weight thereof. It is not desirable to add the crystal modifying catalyst in too dilute a form, however, since large dilutions entail the removal of a greater amount of the solvent.

The most desirable concentration of any particular catalyst varies somewhat from catalyst to catalyst, depending largely on the activity of the particular catalyst chosen. In addition to variations due to the activity of the particular catalyst, the optimum concentration of catalyst also depends somewhat upon the condition of the fatty material being treated. For example, when a catalyst such as stannous chloride or stannous hydroxide is employed, it has been observed that a lard having a high peroxide value requires a larger amount of catalyst to completely crystal modify than a lard which has a low peroxide value. It has also been observed that the peroxide value of a lard decreases appreciably when treated with a hydroxide catalyst such as stannous hydroxide. Thus, for example, when the lard to be modified has an initial peroxide value of 60, it has been found desirable to increase the concentration of stannous hydroxide to about 1.0 per cent, whereas the same lard having a peroxide value of around two or three requires only 0.2 per cent catalyst to crystal modify. Similar results have been observed when other catalysts, such as hydrated stannous chloride, are employed as the catalyst. It is therefore desirable to employ a lard having a relatively low peroxide value. It has likewise been found desirable to remove a large part of moisture initially present in the rendered lard before crystal modifying with the herein-disclosed catalysts.

The time of treatment required to crystal modify lard varies between about 30 minutes and 6 hours, and preferably between about 1 hour and 5 hours. The optimum time of treatment required to produce crystal modified lard varies with the temperature, concentration of catalyst employed, and upon the condition of the triglyceride material being treated. Within the effective temperature range it can generally be said that at the lower temperature the speed of reaction is slower. When the concentration of catalyst is reduced below the optimum value, more time is required to complete the crystal modifying reaction. For example, treating lard with .07 per cent stannous hydroxide at a temperature of about 200° C. produces the same significant degree of crystal modification in 5 hours as 0.2 per cent stannous hydroxide employed at the same temperature produces in one hour. Likewise, it has been found that more time is required to complete crystal modification when the lard has been allowed to stand for prolonged periods after rendering and before commencing the crystal modifying treatment. It is therefore desirable to employ a good quality, freshly rendered lard.

The temperature at which crystal modification is effected with the herein-disclosed crystal modifying catalysts varies between about 120° C. and 260° C. and is preferably maintained between about 175° C. and 225° C. While a wider temperature range could be employed, it has been found advisable to conduct the reaction within the above specified temperature range when employing the herein-disclosed catalysts, since at substantially lower temperatures the rate of reaction is so slow as to make the process commercially impractical, and at substantially higher temperatures the lard is damaged so as to make its subsequent bleaching and refining too costly for commercial operation.

In order to facilitate the crystal modifying reaction and to reduce to a minimum the amount of catalyst required, it has generally been found advisable to conduct the reaction in a closed system under an inert atmosphere. By excluding air during the treatment, there is less danger of damage being done to the triglyceride material so that the subsequent handling thereof is facilitated and rendered less costly.

The lard may be heated in the presence of the catalyst at any stage of processing, and the beneficial results of the crystal modifying treatment are not impaired by subsequent processing such as deodorization and hydrogenation. It is also unnecessary to hold the crystal modified product at any particular temperature in order to retain the beneficial properties imparted to the material. It is preferred to treat the lard with the catalyst prior to refining thereof. Where it is desired to omit the treatments generally employed to impart improved characteristics, the rendered lard may advantageously be directly heated in the presence of the herein-disclosed catalysts to produce crystal modified lard.

The following specific examples should be considered as merely illustrative of the herein-disclosed process and resulting product and should in no way be construed to limit the invention to the particular materials or conditions disclosed therein. In all cases the treated lard possessed a striking appearance, which was quite different from that of untreated lard. The treated lard had a characteristic satiny luster that readily distinguished it from conventional lard. In addition the plastic properties of the treated lard were superior, and cakes made therewith had a larger volume and a finer grain and texture than the cakes made with untreated lard, indicating that dough prepared with the modified lard is capable of entrapping greater quantities of air than is the case with dough made with untreated lard. The texture and fine grain of the cakes also indicate a uniform dispersal of the air throughout the dough.

EXAMPLE I 2,000 grams of prime steam lard were admixed with 2.0 per cent cobaltous nitrate based on the weight of the lard, and heated in an open flask at a temperature of 225° C. for 2 hours with constant stirring. The lard was then refined, bleached, and filtered.

The filtered lard was then chilled and rapidly agitated in an ice bath until plastic. A sample of the original untreated lard was also chilled in a similar manner for comparison with the treated chamber. The untreated product after chilling had a waxy appearance and rubber texture, while the chilled treated lard was softer, more plastic, and had a smooth, creamy appearance which resembled hydrogenated vegetable shortening in its general appearance.

When samples of treated and untreated lard are tempered at 75° C. for a period of 24 hours and consistency readings taken with a Bloom consistometer, the following results are obtained:

TABLE 1

| Temperature (° F.) | Bloom Consistometer Readings | |
| --- | --- | --- |
| | Untreated Lard | Treated Lard |
| 75 | 35 | 7 |
| 60 | 50 | 28 |
| 45 | 88 | 85 |
| 32 | 150 | 140 |

It will be observed from the foregoing data in Table 1 that the treated lard has substantially lower Bloom consistency readings at temperatures above 45° F. than does the untreated lard maintained under the identical conditions.

The X-ray diffraction pattern of the crystal modified lard resembles that of hydrogenated vegetable shortening more closely than it resembles the original prime steam lard.

EXAMPLE II 2,000 grams of bleached steam lard were admixed with 2.0 per cent cobaltous chloride based on the weight of lard, and heated in an open flask at a temperature of 245° C. for a period of 4 hours with constant stirring. The lard was then refined, bleached, and filtered.

During the heating of the lard and prior to refining, bleaching and filtering, samples were taken at the intervals indicated in Table 2, and each sample analyzed to determine its free fatty acid content and melting point.

TABLE 2

| Sample No. | Time (min.) | Temperature (° C.) | Free Fatty Acid (Percent) | Melting Pt. (° F.) |
| --- | --- | --- | --- | --- |
| 1 | 0 | 75 | 0.90 | 112 |
| 2 | 60 | 245 | 1.60 | 110 |
| 3 | 120 | 245 | 1.85 | 109 |
| 4 | 180 | 245 | 2.00 | 109 |

It is evident from the foregoing Table 2 that the catalytic treatment has made no significant change in the melting point of the lard and has only increased the free fatty acid content approximately 1 per cent. The slight drop in the melting point is not considered significant since this does not alter the subsequent processing conditions employed in texturizing and compounding the treated lard into conventional shortening products.

Lard treated for 3 hours in the foregoing manner was formulated with hard lard in the conventional manner on the basis of 86 per cent crystal modified lard and 14 per cent hard lard (50–60 titer). A control sample of untreated lard was compounded in the same manner. The lard samples were texturized and stored for 24 hours at a temperature of about 76° F. and then tested in the bakery, and produced the following baking data:

TABLE 3

| Sample | Pound Cake | | Wet Cream Test, Sp. Gravity |
| --- | --- | --- | --- |
| | Volume (cc.) | Batter, Sp. Gravity | |
| Treated | 1,350 | 0.780 | 0.600 |
| Untreated | 1,260 | 1.10 | 0.845 |

It is evident from the foregoing data in Table 3 that the volume of a pound cake made with the treated lard increases during the first 3 hours of treatment and thereafter does not significantly improve. There is also a noticeable improvement in the specific gravity of the cake batter and the wet cream test specific gravity.

EXAMPLE III 2,000 grams of prime steam lard were admixed with 2 per cent cobaltous acetate based on the weight of the lard, and heated in an open flask at a temperature between 200° and 225° C. for a period of 3 hours with constant stirring. The lard was refined, bleached, and filtered.

After chilling and agitating, the lard treated in the foregoing manner has a very different appearance than the original untreated product which is chilled and agitated in the same manner. The original untreated lard when heated at the same temperature and chilled while being agitated has a waxy or Vaseline-like appearance, whereas the modified product after treating with a catalyst for a period of 4 hours has a velvety sheen or creamy appearance. Also, when temperature readings of samples of the crystal modified lard are taken while the modified lard is being chilled and agitated and these readings plotted on temperature-time coordinates, a uniform cooling curve is obtained. When temperature readings are taken while chilling and agitating the unmodified lard and these readings plotted on identical temperature-time coordinates, there is a noticeable irregularity in the cooling curve.

A portion of the final crystal modified lard was formulated into a blended shortening by compounding 86 per cent treated lard with 14 per cent hydrogenated triglyceride material, such as 50–60 titer lard, so as to give a blended shortening having the desired consistency. The compounded shortening was then chilled while agitating (texturized), and the lard so treated was held at 75° C. for a period of 4 days and then stored at a temperature of 97° F. for several days. Periodically the crystal modified lard samples treated in the foregoing manner and control samples of unmodified lard were examined to determine their appearance and general stability. While both the control and the crystal modified lard-containing samples exhibited a very satisfactory appearance at the end of 3 days' storage at 97° F., there was a very noticeable difference between the treated and the untreated samples by the end of the second week of storage. The control sample appeared to have a dull, waxy, and Vaseline-like appearance and a stiff, relatively hard crinkly texture, whereas the crystal modified lard-containing samples retained their original sheen and smooth, creamy texture. As the holding period continued, the foregoing differences became even more pronounced.

Similar results are observed upon holding for prolonged periods at elevated temperatures the compounded shortenings containing hardened vegetable fat when the shortening contained added monoglycerides and when no monoglycerides were added. This ability of crystal modified lard and compounded shortenings made therefrom to retain their improved appearance, texture, and desirable baking characteristic after prolonged storage at elevated temperatures is an extremely important property of crystal modified lard.

EXAMPLE IV 2,000 grams of prime steam lard were admixed with 1 per cent cobaltous hydroxide based on the weight of the lard, and heated in an open flask for a period of 2 hours at a temperature of 200° C. with constant stirring. The treated lard was refined, bleached, and filtered.

The lard treated in the foregoing manner has the characteristic properties of crystal modified lard in that the Bloom consistency readings of the treated lard were substantially less than the corresponding readings for untreated lard at temperatures above 45° F. Also, the specific gravity of the treated lard after chilling and agitating was substantially less than the specific gravity of the chilled and agitated untreated lard.

EXAMPLE V 2,000 grams of lard were admixed with 2 per cent cobaltic nitrate based on the weight of the lard and heated in an open flask for a period of 6 hours at a temperature of 200° C. with constant stirring. The treated lard was refined, bleached, and filtered.

The lard treated in the foregoing manner exhibits the characteristic properties of crystal modified lard in that the Bloom consistometer readings at temperatures above 45° F. are appreciably lower than the corresponding readings of unmodified lard, and the specific gravity of treated lard was appreciably lower than the untreated lard after texturizing.

EXAMPLE VI 2,000 grams of killing lard were admixed with 2 per cent cobaltic acetate based on the weight of the lard, and heated in an open flask for a period of 5 hours at a temperature of 225° C. with constant stirring. The lard was then refined, bleached, and filtered.

The crystal modified lard had a melting point of 109° F. and a softening point of 97° F., whereas the original untreated lard had a melting point of 112° F. and a softening point of 94° F. The slight variation in melting point and softening point is considered insignificant since the above changes do not require any modification in the manner of handling the lard in the conventional compounding procedure. The crystal modified lard also exhibits the characteristic properties of the crystal modified lard in that its Bloom consistency readings at temperatures above 45° F. were substantially lower than the corresponding readings for the unmodified lard.

In order to determine suitable catalysts and optimum operating conditions for the herein-disclosed crystal modifying treatment, it has been found necessary to employ one or more empirical tests. For example, it has been the practice to run a wet cream test, a water absorption test, and pound cake baking test on the crystal modified lard or on the shortening comprising the crystal modified lard. By comparing the results of the foregoing tests on the treated lard with the results obtained on the control sample, it is possible to chart the course of the crystal modifying reaction and to determine when the crystal modifying treatment has taken place. Thus, when one observes a substantial decrease in the specific gravity of the lard-water emulsion in the wet cream test, a substantial increase in the amount of water which is taken up by the crystal modified material in the water absorption test, or an appreciable increase in the volume of a pound cake in the baking test, crystal modification will have taken place. Other tests based on the herein-disclosed characteristics of crystal modified lard may be conducted, such as taking Bloom consistency readings of the product being treated at temperatures above about 45° F., as the crystal modified product exhibits a substantially lower consistency between about 45° F. and the melting point of the product than does the unmodified lard at the same temperature.

While the foregoing wet cream test, water absorption test, and pound cake baking test are well known to those skilled in the art, the precise procedure employed in conducting these tests is as follows:

Wet cream test

FORMULA 530 grams confectionery sugar
414 grams shortening
56 grams water

METHOD

Have all ingredients at 75° F. Place these ingredients in a 10 quart mixing bowl of a Hobart C-10 machine or the equivalent. Mix for one-half minute at low speed. Scrape down the bowl and beater and then mix for five minutes at second speed. Weigh a representative 200 cc. portion of the creamed mass to obtain the specific gravity. Continue creaming at second speed, and take gravity readings again at 15 minutes and at 25 minutes. The bowl and beater should be scraped down after each gravity reading.

Total mixing time at second speed: 25 minutes
Gravity readings to be reported: 5, 15, and 25 minute intervals
Convert weighings into specific gravity and report as grams per cc.

Water absorption test

Place one pound (454 grams) of shortening material at 75° F. into the 10 quart mixing bowl of the bench Hobart model C-10 or equivalent mixer. Mix for one-half minute at second speed. Scrape down bowl and beater. Water at 75° F. is then added by means of a mayonnaise oil dripping tank at the rate of 30 cc. per minute, the machine running continuously at second speed.

The machine should be stopped at intervals and the water shut off in order to inspect the mix for unemulsified droplets of water. During these inspections, the upper rim of the mix should be scraped down. When droplets of water are present on the surface of the beaten shortening material, the machine should be turned on and run for two minutes with the water shut off. If the droplets are still present, the test is completed. If the droplets are absorbed, more water should be added until the above procedure shows unemulsified droplets present.

To maintain a constant flow of water (30 cc. per minute) a constant level should be kept in the salad oil tank. Report the grams of water emulsified by 1 pound of the shortening material.

Pound cake baking test (without monoglycerides)

FORMULA

|  | Lbs. | Oz. |
|---|---|---|
| Group 1: |  |  |
| Shortening material (containing no monoglycerides) | 0 | 12 |
| Sugar | 1 | 8 |
| Flour (cake) | 0 | 12 |
| Salt | 0 | ¼ |
| Vanilla | 0 | ¼ |
| Milk | 0 | 5 |
| Group 2:¹ |  |  |
| Milk | 0 | 8 |
| Eggs | 0 | 12 |
| Group 3: Flour (cake) | 0 | 12 |

¹ Stir together well.

METHOD

Have all ingredients at 75° F.

Weigh the ingredients of group 1 into the 10 quart bowl of the bench Hobart model C–10 mixer, mix at first speed for 30 seconds and scrape down the bowl. (NOTE.—This is a preliminary mixing period and is not included in the following mixing times.)

Cream 2 minutes at second speed and scrape down the bowl.

Cream 2 minutes at second speed, and again scrape down the bowl.

Cream at first speed for 1 minute, adding one-half of the ingredients of group 2 during the first 20 seconds. Add the ingredients of group 3 and cream 1 minute at first speed.

Cream 1 minute at first speed, adding the other one-half of the ingredients of group 2 during the first 20 seconds.

Take specific gravity of the batter and scale 510 grams of the batter into a standard, paper-lined loaf pan. Bake 65 to 70 minutes at 360° F. Allow cake to cool to room temperature before measuring.

Report volume of finished cake and specific gravity of batter; also consistency and appearance of batter.

*Pound cake baking test (with monoglycerides)*

FORMULA

|  | Lbs. | Oz. |
|---|---|---|
| Group 1: | | |
| Shortening material (containing monoglycerides) | 1 | 7 |
| Sugar, fine granulated | 2 | 7 |
| Salt | 0 | 1 |
| Flour (cake) | 2 | 0 |
| Group 2: | | |
| Milk | 1 | 0 |
| Vanilla | 0 | ½ |
| Group 3: Whole eggs | 1 | 7 |

METHOD

Have all ingredients at 75° F. Mix at first speed.

Scale the ingredients of group 1 into the 10 quart Hobart C–10 mixer bowl in the order given. Scale the ingredients of group 2 separately and pour into the bowl with the ingredients of group 1, starting the machine immediately, very slowly, so that the liquid and dry ingredients pick up without splashing. Mix for one-half minute and scrape down the bowl and beater. Mix for 3 minutes, not including the one-half minute interval at the beginning. Scrape down again and continue mixing for an additional 3-minute interval. Scrape down.

Add one-third of the eggs (75° F.) and mix 1 minute. Stop the machine and add one-third of the eggs. Mix another minute, then stop the machine. Add the final portion of the eggs, scrape down well, and continue mixing for 2 minutes to bring the total mixing time to 10 minutes. Take the specific gravity.

Scale 510 grams of the batter into a regulation paper-lined loaf pound cake pan and bake at 360° F. for 70 minutes. The maximum allowable variation in baking time should not exceed 5 minutes, depending on the load of the oven. Remove from the pan immediately after baking. Allow to cool to room temperature before measuring in the volumemeter.

a. Report specific gravity reading at 10 minutes in grams per cc.
b. Report batter temperature.
c. Report the cake volume in cc.
d. In addition, report such observations as consistency of the batter, appearance of the top crust and grain and texture of the cake.

From the foregoing specific examples describing the characteristics and improved properties of crystal modified lard it will be very apparent to those skilled in the art that crystal modified lard is particularly useful in the preparation of improved shortening products. Thus, any shortening product which has heretofore consisted of a substantial proportion of animal triglyceride material, such as lard, will be provided with very substantially improved baking and storage properties as well as improved appearance, particularly after holding at moderate or elevated temperatures by substituting crystal modified lard for all or part of the unmodified lard in the shortening. The resulting shortening product has been found to have the desirable properties characteristic of an all vegetable shortening while retaining the superior shortening properties of lard. Further evidence of the fundamental alteration of the crystal structure of the lard toward that of a vegetable shortening is evident on observing that the X-ray diffraction pattern of the treated lard much more closely resembles the pattern of a hydrogenated vegetable shortening than that of the original lard. The foregoing has been found to be true in all types of compounded animal fat and animal-vegetable shortenings where the said shortenings contain added animal or vegetable hard fats and monoglycerides or are hydrogenated. Significantly, the improved results obtained with crystal modified lard are in no way dependent upon the presence of monoglycerides since the desirable properties are enhanced by deodorization treatment.

It should thus be apparent that the improved lard obtained in accordance with the invention described herein can be used as an all-purpose shortening in place of both the animal and vegetable shortenings heretofore discriminately employed because of their peculiar properties. The improved lard may thus be advantageously employed in the manufacture of cakes and icings as well as in the preparation of bread and pie crust. Although we have illustrated the invention as being particularly applicable to baked goods, it is also applicable to other food products, such as the manufacture of candy and fried products. It is also understood that the improved fat may be advantageously used in lubricants, greases, cosmetics, medicated ointments, and in many other industrial applications.

This application is a continuation-in-part application of U. S. patent application Serial No. 183,666, filed September 7, 1950, which is a continuation-in-part application of Serial No. 724,468, filed January 25, 1947.

Obviously, many modifications and variations of the invention as hereinbefore set forth may be made without departing from the spirit and scope thereof, and therefore only such limitations should be imposed as are indicated in the appended claims.

We claim:

1. The process of treating lard to permanently alter the normal crystallization habit and improve the appearance and keeping qualities thereof, which comprises subjecting lard to a heat treatment at a temperature between about 120° C. and 260° C. for a period of between about one-half hour and 6 hours in the presence of a small amount of a cobalt salt acting as a crystal modifying catalyst to permanently alter the crystal habit of the lard without causing a significant amount of interesterification whereby the formation of long needle-like crystals is avoided.

2. The process substantially as described in claim 1 wherein the heat treatment is carried out at a temperature between about 175° C. and 225° C. for a period of between about one hour and 5 hours.

3. The process substantially as described in claim 2 wherein the cobalt salt acting as the crystal modifying catalyst is a cobalt halide.

4. The process substantially as described in claim 2 wherein the cobalt salt acting as the crystal modifying catalyst is a cobalt chloride salt.

5. The process substantially as described in claim 2 wherein the cobalt salt acting as the crystal modifying catalyst is a cobalt nitrate salt.

6. The process substantially as described in claim 2 wherein the cobalt salt acting as the crystal modifying catalyst is a cobalt acetate salt.

7. A process substantially as described in claim 2 wherein the cobalt salt acting as the crystal modifying catalyst is a cobalt hydroxide salt.

8. The process of treating lard to permanently alter the normal crystallization habit and improve the appearance and keeping qualities thereof, which comprises subjecting lard to a heat treatment at a temperature between about 200° C. and 225° C. for a period of between about 2 and 5 hours in the presence of about 2.0 per cent based on the weight of the lard of the crystal modifying catalyst cobaltous hydroxide to permanently alter the crystal habit of the lard without causing a significant amount of interesterification whereby the formation of large needle-like crystals during solidification and subsequent storage is avoided.

KARL F. MATTIL.
FRANK A. NORRIS.

REFERENCES CITED

The following references are of record in the file of this patent:

UNITED STATES PATENTS

| Number | Name | Date |
|---|---|---|
| 2,024,103 | Krumbhaar | Dec. 10, 1935 |
| 2,309,949 | Gooding | Feb. 2, 1943 |

FOREIGN PATENTS

| Number | Country | Date |
|---|---|---|
| 249,916 | Great Britain | Mar. 30, 1926 |